Patented Mar. 12, 1946

2,396,557

UNITED STATES PATENT OFFICE 2,396,557

STABILIZATION OF POLYVINYL ACETAL

Fred W. Cox, Cuyahoga Falls, Ohio, assignor to Wingfoot Corporation, Akron, Ohio, a corporatin of Delaware No Drawing. Application December 29, 1942,
Serial No. 470,486

1 Claim. (Cl. 260—73)

This invention relates to the stabilization of polyvinyl acetal compositions. The acetals may be obtained by the partial conversion of polyvinyl alcohol with an aldehyde. For instance, the commercial polyvinyl butyral resin contains about 20 per cent of hydroxy and about 2 per cent acetate groups, the balance being polyvinyl butyral. Although the invention applies to other acetals, such as polyvinyl acetal and polyvinyl propional, it will be described more particularly in connection with the stabilization of polyvinyl butyral resin because this is the most common commercially.

The stabilizer of this invention is an alkylene diamine having the formula $R_1R_2N \cdot C_2H_4 \cdot NR_1R_2$ in which $R_1$ is an aryl group and may be a hydrogenated or substituted aryl group, and $R_2$ is hydrogen (in which case the stabilizer includes the amino salts) or alkyl, and both $R_2$'s may constitute an ethylene group forming a piperazine derivative. The stabilizer may, for example, be:

N,N'-di-2-methyl cyclohexyl piperazine
N,N'-(2,4-dimethyl cyclohexyl) piperazine
N,N'-di-o-tolyl piperazine
N,N'-di-2-methyl cyclohexyl ethylene diamine
N,N'-di-3-methyl cyclohexyl ethylene diamine dithiocarbamate
N,N'-diphenyl piperazine
N,N'-diphenyl ethylene diamine
N,N'-di-o-tolyl ethylene diamine
N,N'-dicyclohexyl ethylene diamine
N,N'-dicyclohexyl piperazine Any of these stabilizers when present in a small amount prevents or inhibits decomposition of the polyvinyl acetal resin when subjected to heat. In the absence of any stabilizer, the polyvinyl acetal resins decompose at elevated temperatures and discolor. The presence of one of the stabilizers of this invention prevents or retards such discoloration.

The stabilizer will usually be used in an amount equal to at least about 0.5 per cent of the polyvinyl acetal resin, and as much as 10 per cent or more may be employed. The stabilizer may be incorporated in the resin in any suitable manner. The use of the stabilizer is illustrated in the following example:

*Example*

Two cements—one containing 1 part of polyvinyl butyral resin in 4.6 parts by weight of alcohol and the other containing 1 part of polyvinyl butyral and 0.02 part of N,N'-di-2-methyl cyclohexyl piperazine in 4.6 parts by weight of alcohol—are poured into glass molds and the alcohol allowed to evaporate. The resulting films are placed in an oven at 110° C. At the end of a few hours the film containing the stabilizer will be found to be less discolored than that to which nothing has been added.

What I claim is:

A composition containing a polyvinyl acetal formed from polyvinyl alcohol and an aliphatic aldehyde which contains N,N'-dicyclohexyl ethylene diamine as a stabilizer.

FRED W. COX.